United States Patent [19]

Zikmund et al.

[11] Patent Number: 4,871,519
[45] Date of Patent: Oct. 3, 1989

[54] METHOD OF MAKING MAGNESIUM OXIDE AND HYDRATES THEREOF

[75] Inventors: Miroslav Zikmund; Cestmir Hybl, both of Bratislava; Vendelin Macho, Novaky; Valer Adam, Bratislava, all of Czechoslovakia

[73] Assignee: Vyskumny ustav pre petrochemiu Prievidza, Prievidza, Czechoslovakia

[21] Appl. No.: 154,699

[22] Filed: Feb. 11, 1988

Related U.S. Application Data

[63] Continuation of Ser. No. 890,294, Jul. 29, 1986, abandoned.

[51] Int. Cl.$^4$ .............................. C01F 5/06; C01F 5/16; C01F 11/06
[52] U.S. Cl. ................................ 423/169; 423/175; 423/635; 423/637; 423/639
[58] Field of Search ............... 423/158, 157, 175, 636, 423/635, 637, 639, 169, 173, 155, DIG. 14; 23/293 R

[56] References Cited

U.S. PATENT DOCUMENTS

| | | | |
|---|---|---|---|
| 2,137,675 | 11/1938 | MacIntire | 423/169 |
| 2,155,139 | 4/1939 | MacIntire | 423/169 |
| 2,209,444 | 8/1940 | deBeeze | 423/169 |
| 2,354,584 | 7/1944 | Elkington et al. | 423/169 |
| 2,403,939 | 7/1946 | MacIntire | 423/169 |
| 2,603,555 | 7/1952 | Hulme | 423/169 |
| 2,793,942 | 5/1957 | Clarke et al. | 423/169 |
| 2,898,194 | 8/1959 | Eells et al. | 423/169 |
| 3,341,290 | 9/1967 | Bornemann et al. | 423/157 |
| 3,366,451 | 1/1968 | Waldron et al. | 423/169 |
| 3,409,398 | 11/1968 | Housh | 423/157 |
| 3,415,617 | 12/1968 | Thompson et al. | 423/169 |
| 3,819,803 | 6/1974 | Tabata et al. | 423/158 |
| 4,051,223 | 9/1977 | MacKay | 423/157 |
| 4,108,958 | 8/1978 | Kok et al. | 423/24 |
| 4,243,555 | 11/1981 | Lee et al. | 210/687 |
| 4,370,307 | 11/1983 | Judd | 423/432 |
| 4,389,323 | 6/1983 | Gancy | 423/175 |
| 4,508,690 | 4/1985 | Obrist et al. | 423/173 |
| 4,624,704 | 11/1986 | Byeseda | 423/157 |

OTHER PUBLICATIONS

Julius Grant, "Hackh's Chemical Dictionary", Fourth Edition, 1969.

*Primary Examiner*—Anthony Mc Farlane
*Attorney, Agent, or Firm*—Waldron & Associates

[57] ABSTRACT

A process for producing magnesium oxide and/or hydrates thereof from predominantly magnesium or magnesium-calcium raw materials, and optionally producing calcium carbonate, whereby the raw material is roasted if necessary to form a mixture of magnesium oxide and calcium oxide. The calcium oxide is then dissolved from the mixture using an aqueous solution containing an organic amine and a salt of an organic amine with an acid capable of forming a soluble calcium salt with said organic amine. Separating the solution from the undissolved magnesium oxide and treating the solution with carbon dioxide will cause the dissolved calcium to be precipitated and calcium carbide.

20 Claims, No Drawings

METHOD OF MAKING MAGNESIUM OXIDE AND HYDRATES THEREOF

This application is a continuation of applicants' prior copending application, Ser. No. 890,294, filed July 29, 1986; now abandoned.

This invention relates generally to a method of producing magnesium oxide and/or the hydrates thereof such as magnesium hydroxide. More specifically, this invention relates to simple and inexpensive method of producing a relatively pure magnesium oxide, and/or hydrates of magnesium oxide, as well as optionally producing a relatively pure calcium carbonate. The inventive method is further directed towards the utilization of a broad spectrum of magnesium and calcium containing raw materials, particularly the carbonates and oxides, and particularly those carbonates and oxides which are the roasted products of magnesite, dolomagnesite, dolomitic limestone, magnesian dolomite and the like.

BACKGROUND OF THE INVENTION

Except for limestone, dolomite is the most abundant naturally occurring carbonate. Because of its composition, typically, 30.4 wt. % CaO, 21.7 wt. % MgO, and 47.9 wt. % $CO_2$, dolomite is an important natural resource for preparing the compounds of magnesium and calcium as well as carbon dioxide. Among the calcium compounds, calcium carbonate is perhaps the most broadly used, finding abundant applications in the paper, pharmaceutical, cosmetic, food, chemical and cement industries, and as a pigment in plastics, rubber, dyes and paint. Among the compounds of magnesium, magnesium oxide is of extraordinary importance and is utilized as a fundamental component of basic refractories, as a material in the electrochemical industry, as a catalyst or catalyst carrier in the crude oil industry, and is utilized in paper and pulp industry in the so called magnesium bisulphite process of cellulose production, as well as many other applications including the cement, plastics and pharmaceutical industries.

Commercial methods are known and utilized for producing magnesium oxide, the hydrates thereof, as well as calcium carbonate from the above noted carbonate and oxide raw materials. These prior art processes are, however, rather complicated chemically and require an extensive investment to build a commercial plant for the production of these products.

It is well known, for example, that magnesium oxide and calcium carbonate can be produced from dolomite and magnesian limestone by a partial thermal decomposition thereof at a first stage temperature up to about 800° C. depending upon the reaction conditions. These two reaction products, however, are produced in a powdery admixture from which they cannot be separated by any known physical process. While there are several known chemical processes for separation of the two constituents, most are based on the selective dissolution of the magnesium oxide, whereby only calcium carbonate is recovered directly, leaving the dissolved magnesium oxide to be further processed to produce various compounds thereof. For example, one known process utilizes solutions of ammonium carboxylates and particularly ammonium formate, to dissolve the magnesium oxide, and within which calcium carbonate is insoluble. The magnesium containing solution is thereafter further processed to produce magnesium hydroxide, (see Czechoslovakian Inventors Certificate No. 180,284) magnesium basic carbonate, (See Czechoslovakian Inventors Certificate No. 196,905); magnesium carbonate trihydrate (See Czechoslovakian Inventors Certificate No. 194,644); and the like, from which magnesium oxide can thereafter be produced if desired. In accordance with Czechoslovakian Inventors Certificate No. 199,323, there arises during the extraction by aqueous solutions of ammonium sulphate, nitrate or chloride, the corresponding magnesium salts which are subsequently converted to magnesium basic carbonate or oxide. These compounds exist among the products of magnesium oxide manufacturers. Other methods of extracting magnesium dolomite and dolomitic limestone have been disclosed in Rumanian Patent Specification Nos. 55,712 and 59,779.

The thermal decomposition of dolomite at a second stage temperature exceeding 900° C., produces a mixture of oxides, theoretically about 41.7 wt. % MgO and 58.3 wt. % CaO. As before, these two oxides cannot be separated by any known physical process. A chemical process is known for increasing the magnesium oxide content whereby the admixture is reacted with nitric acid, ammonium nitrate, ammonium formate or ammonium acetate, to remove merely a portion of the calcium oxide from the insoluble residue (See Czechoslovakian Inventors Certificate No. 190,976);. As a result, the residue will have an increased magnesium oxide content consisting of about 26.8 to 43.0 wt. % CaO and 52.6 to 72.4 wt. % MgO The extracting solution can be further processed with ammonia and carbon dioxide to produce calcium carbonate and the corresponding ammonium salt.

These and the other prior art processes all tend to suffer certain disadvantages, such as effecting only a partial separation, or being contaminated with by-product impurities thus necessitating further refining efforts. In addition to multiple processing steps, even the simple, basic processing steps are complicated rendering difficulties in the processes, such as difficulty in processing, including such difficulties as poor filterability, washability and dehydration and the like.

SUMMARY AND OBJECTS OF THE INVENTION

These and other disadvantages of the prior art are eliminated by the process of this invention which is based predominantly upon the selective extraction of calcium oxide, and its hydrates, from admixture with magnesium oxide and its hydrates, with or without the further admixture or normal insoluble impurities such as compounds of silicon, aluminum, iron and the like as may be found in the dolomitic raw materials.

Accordingly, it is an object of this invention to provide a simple and inexpensive process for producing magnesium oxide and/or the hydrates thereof such as magnesium hydroxide.

It is another object of this invention to provide a simple and inexpensive process for producing a relatively pure magnesium oxide and/or hydrates thereof, while additionally producing a relatively pure calcium carbonate from magnesium oxide and calcium oxide admixtures, or raw materials such as the roasted products of magnesite, dolomagnesite, dolomitic limestone, magnesian dolomite and the like.

It is a further object of this invention to provide a process for producing magnesium oxide and/or hydrates thereof and calcium carbonate from magnesium and calcium containing raw materials, and particularly carbonates and oxides thereof such as magnesite, dolomagnesite, dolomitic limestone, magnesian dolomite and the like.

It is still another object of this invention to provide a simple and inexpensive process, utilizing few processing steps, for producing relatively pure magnesium oxide and/or hydrates thereof, and optionally producing a relatively pure calcium carbonate utilizing a rather broad spectrum of magnesian limestone raw materials, which does not give rise to any noxious gases or fumes or waste water, and can easily and inexpensively be adapted to commercial applications.

DESCRIPTION OF THE INVENTION

In accordance with one embodiment of this invention, the production of magnesium oxide and its products of hydration, is based upon the selective dissolution of calcium oxide and hydrates thereof from a mixture of the two oxide constituents. It should be understood that while the oxides are the normal constituents, various hydrates thereof may be formed by the interaction of water with the oxides, and will normally be present in some amount. Any of the common magnesium and calcium containing oxide, carbonate and even hydroxide raw materials will suffice as the starting material, such as magnesite, dolomagnesite, dolomitic limestone, magnesian dolomite and the like. Especially suitable raw materials are magnesite, relatively pure dolomite or magnesian limestone, because the calcium oxide produced therefrom is relatively pure as a general rule, at least to a considerable extent using the process described in Czechoslovakian Inventors Certificate Application No. PV 9153-83. Since the process requires a mixture of the two oxides, the use of a carbonate raw material will first require the material be thermally decomposed at temperatures in excess of 900° C. whereby a mixture of magnesium and calcium oxides is produced as described above.

The crux of this invention involves the selective dissolution of calcium oxide and its hydrates at a temperature of from zero to 100° C. utilizing an aqueous solution containing at least one organic amine either alone or preferable together with ammonia and/or ammonium hydroxide, and at least one salt formed of an organic amine with an acid, organic or inorganic, capable of forming a water soluble calcium salt with said organic amine, with or without said ammonium hydroxide. The solution, when its constituents are mixed in the proper proportion, will dissolve substantially all of the calcium oxide and the hydrates thereof. The magnesium oxide containing residue is then separated from the solution by any suitable means, such as filtering or centrifuging, and then washing and drying.

To produce calcium carbonate, the solution must be separated from the undissolved residue and then treated with gaseous carbon dioxide and/or ammonium carbonate to precipitate calcium carbonate at a pH of from 7 to 12. The residue will be predominantly magnesium oxide and/or magnesium hydroxide containing only trace amounts of calcium oxide, as well as any silicon, iron and aluminum originating from the original raw material.

If the process of the invention is utilized for the production of magnesium oxide or its hydrates having a predetermined calcium component such as calcium oxide, it is necessary to apply a substoichiometric proportion of the extracting solution as necessary to extract only the amount of calcium constituent as necessary. On the other hand, when it is desired to completely extract the calcium constituents from the oxide mixture, it is necessary to use a stoichiometric, or preferably, superstoichiometric amount of the extracting solution, calculated on the content of extractable calcium component in the material to be treated.

The reaction of the process for dissolution of the calcium oxide and it hydrates can be expressed as follows:

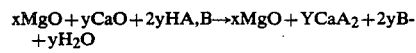

$$xMgO + yCaO + 2yHA,B \rightarrow xMgO + YCaA_2 + 2yB + yH_2O$$

wherein:

HA is a monoacid or a mixture of acids,

B is the organic amine or a mixture thereof and

HA,B is a salt of an acid or acids with the organic amine.

While most any known organic amine may work, those preferred are the readily available amines such as the alkyl amines and derivatives thereof such as ethyl amine, diethyl amine, ethylene diamine, piperidine, alkanol amine and derivatives thereof such as monoethanol amine (2-aminoethanol), diethanol amine ($(HOCH_2CH_2)_2NH$), triethanol amine ($(HOCH_2CH_2)_3N$), 1-amino-2-propanol ($CH_3CH(OH)CH_2NH_2$), 1,3-diamino-2-propanol ($H_2NCH_2CH(OH)-CH_2NH_2$), N,N'-bis-(hydroxyethyl)ethylene diamine ($(HOCH_2CH_2NHCH_2)_2$), N,N,N', N'-tetra-bis-(hydroxyethyl)ethylene diamine ($(HOCH_2CH_2)_2NCH_2CH_2N(CH_2CH_2OH)_2$), 1,4-diethanol piperazine, 1,4-dihydroxydiethyl piperazine ($HOCH_2CH_2N(CH_2CH_2)_2NCH_2CH_2OH$), or the like. In addition to these individual organic amines, combinations thereof may also be used.

In a like manner, the solution may also contain a combination of acids, i.e. anions of a plurality organic and/or inorganic acids, ideally including hydrochloric, nitric, formic, acetic and propionic acids. While a combination of organic base salts could also be utilized, it is preferable for process stability that, apart from the ammonia and/or ammonium hydroxide, only one organic base salt be used. Among the most suitable organic bases for the salt are the organic nitrogenous bases containing at least one hydroxyl group bonded to a carbon atom, as well as salts of such bases as monoethanol amine chloride, diethanol amine chloride, monoethanol amine formate, monoethanol amine acetate, monoethanol amine propionate and the like. Among the ammonium salts, ammonium formate and acetate are preferred.

In dissolving the calcium oxide and its hydrates froom the mixture, a calcium salt is formed of the corresponding acid. With reference to the above equation, the two reaction products in solution are $CaA_2$ and $2B$. When the solution is completely separated from the residue, it is treated with carbon dioxide at a solution temperature up to 100° C., and preferably 20° to 70° C., at a pH of from 7 to 12, and preferably 7.5 to 9. The gaseous carbon dioxide should have a medium pressure of from 0.09 to 2 MPa, preferably 0.1 to 0.3 MPa to precipitate calcium carbonate in a form which will readily settle and can be easily filtered. The calcium carbonate can accordingly be easily separated from the aqueous solution by any conventional means such as decanting, centrifuging and filtering. The reaction involved can be represented as follows:

$$yCaA_2 + 2yB + yCO_2 + H_2O \rightarrow yCaCO_3 + 2yHA,B.$$

To precipitate a sufficient amount of the calcium component, the B base should be present in a slightly super-stoichiometric proportion relative to the composition of HA,B.

The carbon dioxide for precipitating calcium carbonate can be present as pure carbon dioxide or in admixture with air, nitrogen, carbon monoxide, methane and any other diluting gas that will not react with the components of the extracting solution. It should be apparent the use of non-pure carbon dioxide gas would offer certain advantages in permitting the use of certain by-product off gases, which may, for example contain considerable quantities of carbon monoxide. For commercial applications, the impure carbon dioxide obtained from the thermal decomposition of the raw material may offer considerable advantage.

The calcium carbonate produced in accordance with the above preferred embodiment, is of exceptional high purity, being more that 99 wt. % $CaCO_3$, and does not contain any substances normally associated with the calcium oxide or its hydrates following the thermal decomposition.

The spent extracting solution, having its calcium content removed therefrom, can be recirculated for reuse. The solution should, however, be cleansed of any remaining carbon dioxide by heating, bubbling of inert gas or air therethrough or vacuum treatment. Another ideal method is to treat the solution with calcium compound such as calcium oxide or hydroxide, to form calcium carbonate according to the above reaction. Especially suitable would be any low grade form which may be obtained as a waste product.

It should be understood that the term "oxide raw material" should include not only admixtures of magnesium and calcium oxides, but also oxides which are predominantly magnesium oxide as well as partial or complete hydrates thereof. It should be further noted that the process of this invention can be utilized for refining magnesium oxide and hydroxide because the final product is a much purer form than that before the treatment with the extracting solution.

It should be apparent to those skilled in the art that one of the primary advantages of this invention resides in the pure simplicity of the process and its few processing steps. This process, therefore, eliminates the need for any complex and expensive manufacturing plant features, and is yet capable of producing relatively pure magnesium oxide and its hydrates, as well as a relatively pure, fine grained calcium carbonate. Another advantage of the process can be seen by its ability to utilize a relatively broad spectrum of magnesian limestone initial raw materials, and can even be utilized to upgrade and refine magnesium oxide and its hydrates obtained by other than the above described technique. In addition, the process can readily be effected in continuous fashion which does not give rise to any noxious, gaseous fumes or waste water, since the regenerated extracting solution, containing the initial reactants, and particularly the organic amine, can be returned to be re-used repeatedly for further selective extraction.

EXAMPLES

In order to facilitate a better understanding of this invention, the following examples describe some specific practices thereof which are only exemplary and should not be deemed to in any way limit the scope of the invention.

EXAMPLE 1

100 parts by weight of dolomite composed of 30.81 wt. % CaO, 21.33 wt. % MgO, 0.32 wt. % $SiO_2$, 0.21 wt. % $Al_2O_3$ and 0.22 wt. % $Fe_2O_3$ (47.10% weight loss on thermal decomposition) was thermally decomposed at 990° C. The roasted product was ground and screened over a 0.06 mm-mesh sieve and then added gradually to 600 parts by weight of warm (20° C.) aqueous solution containing 120 parts by the weight of diethanol amine formate and 50 parts by weight of monoethanol amine. The solution was heated by reaction heat caused by the admixture to a temperature of about 50° to 60° C. After one hour's agitation, an insoluble residue was filtered from the solution containing predominantly magnesium oxide and hydrates thereof. From the filtrate, cooled to a temperature of from 30° to 40° C., calcium carbonate was precipitated by supplied carbon dioxide until reaching a pH of 8. The yield of 52 parts by weight of calcium carbonate contained 99.6 wt. % $CaCO_3$ (calculated to decomposed state) corresponded to 95% yield respective to the calcium oxide content in the initial raw material. The insoluble residue, once washed and dried, had the following composition: 96.65 wt. % MgO, 0.31 wt. % $Al_2O_3$ and 0.85 wt. % $Fe_2O_3$ (respective to the decomposed state).

EXAMPLE 2

100 parts by weight of dolomite consisting of 30.61 wt. % CaO, 21.67 wt. % MgO, 0.15 wt. % $SiO_2$, 0.02 wt. % $Al_2O_3$, and 0.03 wt. % $Fe_2O_3$ (47.50% weight loss on thermal decomposition) was thermally decomposed at 100° C. The roasted product was ground and screened through a 0.06 mm-mesh sieve, and then suspended in 300 parts by weight of water. The suspension was then added gradually and under steady agitation to 300 parts by weight of warm (60° C.) aqueous solution containing 150 parts by weight of monethanol amine acetate and 60 parts by weight monoethanol amine. After one hour's agitation, the insoluble residue was separated by filtering. The filtrate was then cooled to a temperature of from 30° to 40° C. and treated with carbon dioxide until a pH to 8 was reached. The filtered precipitate yielded 51.5 parts by weight of calcium carbonate containing 99.5 wt. % $CaCO_3$, corresponding to 94% yield respective to the calcium oxide content in the initial raw material. The insoluble residue, after washing and drying, had the composition: 97.68 wt. % MgO, 0.92 wt. % CaO, 0.76 wt. % $SiO_2$, 0.19 wt. % $Al_2O_3$ and 0.24 wt. % $Fe_2O_3$ (respective to the decomposed state).

EXAMPLE 3

100 parts by weight of a dolomite roasted product composed of 58.31 wt. % CaO, 41.25 wt. % MgO, 0.32 wt. % $SiO_2$, 0.05 wt. % $Al_2O_3$ and 0.05 wt. % $Fe_2O_3$, and prepared by thermal decomposition of dolomite at 1000° C., was crushed, ground and added, under steady agitation, gradually to 120 parts by weight of warm (20° C.) aqueous solution containing 280 parts by weight of piperidine chloride and 30 parts by weight of monoethanol amine. After one hour's agitation, the solution was heated by the reaction occurring therein to 50° C. and was filtered. The insoluble residue was washed with water and dried. The composition of the residue was 97.69 wt. % MgO, 0.94 wt. % CaO, 0.81 wt. % $SiO_2$, 0.22 wt. % $Al_2O_3$ and 0.25 wt. % $Fe_2O_3$ (respective to the decomposed state). The solution was treated with carbon dioxide at a temperature of 30° to 40° C., until reaching a pH of 7.5. The precipitate was then filtered, washed with demineralized water and dried. The product was 99.2 wt. % $CaCO_3$, corresponding to 97% yield respective to the calcium oxide in the initial raw material.

EXAMPLE 4

100 parts by weight of a roasted product of magnesian limestone having the composition of 78.15 wt. % CaO, 20.25 wt. % MgO, 0.30 wt. % $SiO_2$, 0.25 wt. % $Al_2O_3$ and 1.05 wt. % $Fe_2O_3$, prepared by the thermal decomposition of the magnesian limestone at 1100° C., was added gradually under steady agitation to 1300 parts by weight of a aqueous solution (15° C.) containing 300 parts by weight of monoethanol amine chloride and 45 parts by weight of diethanol amine. After one hour's agitation the solution heated as a result of the reaction occurring therein to about 50° C., and was filtered. The residue composition was 92.15 wt. % MgO, 0.55 wt. % CaO, 1.25 wt. % $SiO_2$, 1.20 wt. % $Al_2O_3$ and 4.85 wt. % $Fe_2O_3$. The filtrate was treated with carbon dioxide at a temperature of 60° to 70° C. The yield from the precipitate was 135 parts by weight consisting of 99.3% $CaCO_3$, which corresponds to a 97% yield relative to the calcium oxide content in the original raw material.

EXAMPLE 5

100 parts by weight of dolomite composed of 54.06 wt. % $CaCO_3$, 45.34 wt. % $MgCO_3$, 0.15 wt. % $SiO_2$, 0.02 wt. % $Al_2O_3$ and 0.03 wt. % $Fe_2O_3$ was thermally decomposed at 1000° C. and then crushed and ground, and then added under steady agitation to 700 parts by weight of an aqueous solution (20° C.) containing 75 parts by weight of ammonium propionate ($C_2H_5CO_2NH_4$), 95 parts by weight of monoethanol ammonium propionate ($C_2H_5CO_2NH_3C_2H_4OH$) and 20 parts by weight of monoethanol amine ($H_2NC_2H_4OH$). After one hour's agitation the solution heated as a result of the reaction occurring therein to a temperature of about 35° C. and was filtered. The residue, washed with distilled water and dried, was 20 parts by weight of product, and had the composition; 97.75 wt. % MgO, 0.70 wt. % CaO, 0.79 wt. % $SiO_2$, 0.25 wt. % each for $Al_2O_3$ and $Fe_2O_3$ (relative to the decomposed state). The filtrate was treated with carbon dioxide at a temperature of from 30° to 40° C. until attaining a pH of 7.5. The filtrate was regenerated and reused to process the next batch of roasted dolomite product.

EXAMPLE 6.

100 parts by weight of magnesian limestone roasted product, containing 78.15 wt. % CaO, 20.25 wt. % MgO, 0.30 wt. % $SiO_2$, 0.25 wt. % $Al_2O_3$ and 1.05 wt. % $Fe_2O_3$ and prepared by the thermal decomposition at 1000° C., was added gradually under steady agitation to 1400 parts by weight of an aqueous solution (25° C.) containing 96 parts by weight ammonium formate ($HCO_2NH_4$), 145 parts by weight of monoethanol amine formate ($HCO_2NH_4C_2H_4OH$), 15 parts by weight of magnesium formate ($Mg/HCO_2/_2$) and 20 parts by weight of monoethanol amine ($H_2NC_2H_4OH$). After one hour's agitation the solution heated as a result of the reaction occurring therein to about 45° C. and was filtered in a filter press. The filter cake, containing magnesium oxide, calcium oxide and the hydrates of both, was suspended in 500 parts by weight of water and the unextracted calcium oxide was converted to calcium carbonate by supplying carbon dioxide thereto. The precipitate containing predominantly partially hydrated magnesium oxide, calcium carbonate and undissolved partially hydrated oxides of silicon, aluminum and iron was filtered off, washed and dried. This product annealed at 1000° C. contained 85 wt. % MgO, 7.5 wt. % CaO, 1.30 wt. % $SiO_2$. 1.15 wt. % $Al_2O_3$ and 4.80 wt. % $Fe_2O_3$. At 60° C. the filtrate was treated with carbon dioxide, and the calcium carbonate filtered therefrom. The filtrate was usable for extracting another batch of calcium oxide from a magnesium limestone roasted product.

EXAMPLE 7

100 parts by weight of magnesite roast product having 45.10 wt. % MgO, 1.85 wt. % CaO, 0.20 wt. % $Al_2O_3$, 0.50 wt. % $Fe_2O_3$ and 0.35 wt. % $SiO_2$ (52.15 wt. % loss on thermal decomposition). The roast product after grinding and screening through a 0.06 mm-mesh sieve, was added gradually to 500 parts by weight of a solution containing 30 parts by weight of ethylene diamine acetate (($CH_3CO_2)_2CH_2NH_3$), 25 parts by weight of ammonium acetate ($CH_3CO_2NH_4$) and 20 parts by weight of diethanol amine ($NH/C_2H_4OH/_2$). After one hour's agitation, the undissolved residue was separated by filtration and washed with demineralized water. The composition of the dry product recalculated to the decomposed state was 96.85 wt. % MgO, 0.35 wt. % CaO, 0.55 wt. % $Al_2O_3$ 1.25 wt. % $Fe_2O_3$ and 0.70 wt. % $SiO_2$. The filtrate was regenerated by precipitating calcium carbonate with carbon dioxide.

EXAMPLE 8

100 parts by weight of dolomite containing 30.81 wt. % CaO, 21.33 wt. % MgO, 0.32 wt. % $SiO_2$, 0.21 wt. % $Al_2O_3$ and 0.22 wt. % $Fe_2O_3$ was decomposed at about 1050° C. The product was added under steady agitation to 300 parts by weight of water, and to that was added under steady agitation a solution (40° C.) containing 94 parts by weight of ammonium acetate, 34 parts by weight of triisobutylammonium chloride and 50 parts by weight of monoethanol amine. After 100 minutes of agitation, the residue was separated by filtering and cooled to 28° to 30° C. The solution was treated with carbon dioxide until attaining a pH of 7.9, and the precipitate filtered off, washed and dried. The filtered product yielded 51.51 parts by weight calcium carbonate, containing 95.5 wt. % $CaCO_3$, corresponding to 94% yield. The insoluble residue contained 97.3 wt. % MgO, 0.93 wt. % CaO, 0.73 wt. % $SiO_2$, 0.41 wt. % $Al_2O_3$ and 0.52 wt. % $Fe_2O_3$.

What is claimed is:
1. A method of producing magnesium oxide and hydrates thereof from an admixture consisting essentially of magnesium oxide and calcium oxide, the steps comprising;
(a) reacting said admixture at a temperature of from 0° to 100° C. with an aqueous solution containing at least one organic amine, or a salt formed of an organic amine and an acid capable of forming a water soluble calcium salt with said organic amine, in stoichiometric amounts sufficient to dissolve at least a portion of the calcium oxide and its hydrates and to form a residue according to the equation;

$$xMgO + yCaO + 2yHA,B \rightarrow xMgO + YCaA_2 + 2yB + yH_2O$$

wherein:
HA is a monoacid or a mixture of acids,
B is the organic amine or a mixture thereof and
HA,B is a salt of an acid or acids with the organic amine, and (b) separating said solution from the residue, said residue consisting essentially of magnesium oxide and hydrates thereof.

2. A method according to claim 1 whereby calcium carbonate is also produced, the steps additionally comprising:

(a) maintaining said solution at a temperature up to 100° C. after it is separated from said residue;

(b) adjusting the solution pH to a value of from 7 to 12;

(c) treating said solution with carbon dioxide at a gaseous pressure of from 0.09 to 2 MPa, thereby precipitating calcium carbonate from the solution; and (d) separating said solution from the precipitate, said precipitate consisting essentially of pure calcium carbonate.

3. A process according to claim 1 in which said admixture of magnesium oxide and calcium oxide is the roasted product of a magnesium and calcium containing raw material.

4. A process according to claim 3 in which said raw material is magnesite, dolomagnesite, dolomitic limestone or magnesian dolomite.

5. A process according to claim 4 in which said admixture is obtained by thermally decomposing said raw material at a temperature above 900° C.

6. A method according to claim 1 in which said organic amine is an alkyl amine.

7. A method according to claim 1 in which said organic amine is an alkyl amine selected from the group consisting of ethyl amine, diethyl amine, ethylene diamine and piperidine.

8. A method according to claim 7 in which said organic amine is an alkanol amine selected from the group consisting of monoethanol amine (2-aminoethanol), diethanol amine ($(HOCH_2-CH_2)_2NH$), triethanol amine (($HOCH_2CH_2)_3N$), 1-amino-2-propanol ($CH_3CH(OH)CH_2NH_2$), 1,3-diamino-2-propanol ($H_2NCH_2CH(OH)-CH_2NH_2$), N,N'-bis-(hydroxyethyl) ethylene diamine (($HOCH_2CH_2NHCH_2)_2$), N,N,N',N'-tetra-bis-(hydroxyethyl)ethylene diamine (($HOCH_2CH_2)_2NCH_2CH_2N(CH_2CH_2OH)_2$), 1,4-diethanol piperazine, 1,4-dihydroxydiethyl piperazine ($HOCH_2CH_2N(CH_2CH_2)_2NCH_2CH_2OH$) and derivatives thereof.

9. A method according to claim 1 in which said amine is in combination with ammonium hydroxide.

10. A method according to claim 1 in which said amine is in combination with ammonia.

11. A method according to claim 1 in which said acid is hydrochloric acid, nitric acid, formic acid, acetic acid or propionic acid.

12. A method according to claim 1 in which the base of said salt is one having at least one hydroxyl group bonded to a carbon atom.

13. A method according to claim 1 in which said salt is monoethanol amine chloride, diethanol amine chloride, monoethanol amine formate, monethanol amine acetate, or monethanol amine propionate.

14. A method according to claim 2 in which said calcium carbonate is precipitated with ammonium carbonate.

15. A method according to claim 2 in which the solution is maintained at a temperature of from 20° to 70° C. while it is being treated with said carbon dioxide.

16. A method according to claim 2 in which the solution is maintained at a pH from 7.5 to 9 while it is being treated with carbon dioxide.

17. A method according to claim 2 in which said carbon dioxide is at a pressure of from 0.1 to 0.3 MPa.

18. A method according to claim 2 in which said solution is purified of carbon dioxide for reuse in the process.

19. A method according to claim 18 in which said solution is purified of carbon dioxide by treating it with a calcium compound so as to form calcium carbonate.

20. A method according to claim 1 wherein said admixture is reacted with said aqueous solution containing at least one organic amine, or a salt formed of an organic amine and said acid capable of forming a water soluble calcium salt with said organic amine, in a super stoichiometric amounts sufficient to dissolve all of the calcium oxide and its hydrates.

* * * * *